United States Patent
Kimura (10) Patent No.: US 9,772,496 B2
(45) Date of Patent: Sep. 26, 2017

(54) POSITION ADJUSTMENT METHOD OF VEHICLE DISPLAY DEVICE

(71) Applicant: Panasonic Intellectual Property Management Co., Ltd., Osaka (JP)

(72) Inventor: Masayuki Kimura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/263,993

(22) Filed: Sep. 13, 2016

(65) Prior Publication Data

US 2016/0377873 A1 Dec. 29, 2016

Related U.S. Application Data

(63) Continuation of application No. PCT/JP2016/001577, filed on Mar. 18, 2016.

(30) Foreign Application Priority Data

Mar. 27, 2015 (JP) .................. 2015-065879

(51) Int. Cl.
| | |
|---|---|
| G09G 5/00 | (2006.01) |
| G02B 27/01 | (2006.01) |
| B60K 35/00 | (2006.01) |
| B60R 11/02 | (2006.01) |
| B60R 1/00 | (2006.01) |
| G06K 9/00 | (2006.01) |

(52) U.S. Cl.
CPC .......... *G02B 27/0179* (2013.01); *B60K 35/00* (2013.01); *B60R 1/00* (2013.01);
(Continued)

(58) Field of Classification Search
CPC .... G02B 2027/0187; G02B 2027/0181; G02B 2027/0138; G06T 2207/30268;
(Continued)

(56) References Cited

U.S. PATENT DOCUMENTS

| | | | |
|---|---|---|---|
| 2002/0089756 A1 | 7/2002 | Aoki et al. | |
| 2005/0046584 A1* | 3/2005 | Breed ..................... | B60C 11/24 340/13.31 |

(Continued)

FOREIGN PATENT DOCUMENTS

| | | |
|---|---|---|
| JP | 2002-205571 | 7/2002 |
| JP | 2009-262666 | 11/2009 |
| JP | 2013-218346 | 10/2013 |

OTHER PUBLICATIONS

Murphy-Chutorian et al., HyHOPE: Hybrid Head Orientation and Position Estimation for Vision-based Driver Head Tracking, Jun. 6, 2008, 512-517.*

(Continued)

*Primary Examiner* — Robert Craddock
(74) *Attorney, Agent, or Firm* — Wenderoth, Lind & Ponack, L.L.P.

(57) ABSTRACT

In a vehicle display device including a HUD that displays a virtual image on a front field of a view of a driver and a viewpoint detecting camera that captures an image of the driver, a measuring camera is capable of capturing the virtual image. A calibration pattern is at a predetermined position with respect to a viewing angle of the virtual image and angles of view of the viewpoint detecting and measuring cameras. The calibration pattern is captured by the viewpoint detecting and measuring cameras, and the virtual image is captured by the measuring camera. The relative position and orientation between the viewpoint detecting camera and HUD are calculated as orientation information using an image captured by the viewpoint detecting camera and an image captured by the measuring camera. In addition, the position of the virtual image displayed by the HUD is adjusted using the calculated orientation information.

16 Claims, 10 Drawing Sheets

(51) Int. Cl.
*G06T 3/00* (2006.01)
*G06T 7/73* (2017.01)
*B60R 11/04* (2006.01)

(52) U.S. Cl.
CPC .............. *B60R 11/02* (2013.01); *G02B 27/01* (2013.01); *G02B 27/0101* (2013.01); *G06K 9/00832* (2013.01); *G06K 9/00845* (2013.01); *G06T 3/0068* (2013.01); *G06T 7/73* (2017.01); *B60R 11/04* (2013.01); *B60R 2300/205* (2013.01); *G02B 2027/0138* (2013.01); *G02B 2027/0181* (2013.01); *G02B 2027/0187* (2013.01); *G06T 2207/10004* (2013.01); *G06T 2207/10024* (2013.01); *G06T 2207/30204* (2013.01); *G06T 2207/30268* (2013.01)

(58) Field of Classification Search
CPC . G06T 2207/30204; G06T 2207/10024; G06T 2207/10004; B60R 2300/205; B60R 11/04; G06K 9/00832
See application file for complete search history.

(56) References Cited

U.S. PATENT DOCUMENTS

2010/0253542 A1* 10/2010 Seder ..................... G01S 7/22
340/932.2
2012/0154441 A1* 6/2012 Kim .................. G06K 9/00832
345/633

OTHER PUBLICATIONS

Narzt et al., Augmented reality navigation systems, Dec. 21, 2005, Univ Access Inf Soc, Dec. 2006, 177-187.*
Murphy-Chutorian et al., Head Pose Estimation and Augmented Reality Tracking: An Integrated System and Evaluation for Monitoring Driver Awareness, Jun. 2010, IEEE Transactions on Intelligent Transportation Systems, vol. 11, No. 2, 300-311.*
Henderson et al., Evaluating the Benefits of Augmented Reality for Task Localization in Maintenance of an Armored Personnel Carrier Turret, 135-144.*

* cited by examiner

POSITION ADJUSTMENT METHOD OF VEHICLE DISPLAY DEVICE

BACKGROUND

1. Technical Field

The present disclosure relates to a vehicle display device for displaying a virtual image on a field of view of a driver, and particularly relates to a technique for calculating relative position and orientation between a display device and a viewpoint detecting camera for detecting a viewpoint of an observer of the virtual image.

2. Description of Related Art

By mounting a Head Up Display (HUD) in a vehicle, a virtual image can be displayed on a field of view of a driver, and a sight line movement is reduced, whereby a burden of a driver in reading information can be reduced.

In addition, more information can be provided to the driver by an Augmented Reality (AR) display such as marking and highlighting an obstacle ahead.

When such an AR display is performed, if a drawing object and drawing contents are not in a predetermined position relationship as seen from the driver, this causes annoyance and false recognition, and therefore it is desirable that a viewpoint position of the driver is detected so that a drawing position is accordingly changed. Typically, a viewpoint detecting camera is installed in a vehicle compartment, whereby the viewpoint position of the driver is detected.

However, there are error factors in both of the viewpoint detecting camera and the HUD such as unevenness at the time of assembly and displacement at the time of mounting to a vehicle body, and there is a high possibility that the position relationship between the viewpoint detecting camera and the HUD is different from the assumption at the time of design. Therefore, it is desirable that a relative orientation between the viewpoint detecting camera and the HUD is measured by any means after the mounting, and that the drawing is performed based on the measured relative orientation during the drawing.

On the other hand, Patent Literature (PTL) 1 (see Japanese Patent Unexamined Publication No. 2009-262666) discloses a method in which a mirror is installed in the position of the eye of the driver, and the position relationship between the viewpoint detecting camera and the HUD is adjusted while looking at the image of the mirror captured by the viewpoint detecting camera.

SUMMARY

As for the method described in PTL 1, the orientation of the mirror being a mediator is added to the relative orientation between the viewpoint detecting camera and the HUD, and therefore there is a need to know by any means the accurate orientation of the mirror so as to obtain the correct relative orientation. It is troublesome to go through the steps of knowing the accurate orientation of the mirror, and therefore a method capable of more easily measuring the relative orientation is required.

The present disclosure provides a display position adjustment method of a vehicle display device capable of easily measuring the relative orientation between the viewpoint detecting camera and the HUD, and of adjusting the display position of the HUD.

The display position adjustment method in the present disclosure is a position adjustment method of a vehicle display device including a display device configured to display a virtual image on a front field of view of a driver, and a viewpoint detecting camera configured to capture an image of the driver. In addition, the method includes installing a measuring camera in a position capable of capturing a calibration pattern for acquiring information for the virtual image and position adjustment, and disposing the calibration pattern in a predetermined position with respect to a viewing angle of the virtual image, an angle of view of the viewpoint detecting camera, and an angle of view of the measuring camera. In addition, the method includes a step of capturing the calibration pattern by the viewpoint detecting camera and the measuring camera, and a step of capturing the virtual image by the measuring camera. In addition, the method includes a step of calculating a relative position and a relative orientation between the measuring camera and the viewpoint detecting camera, and calculating a relative position and a relative orientation between the measuring camera and the display device by using an image captured by the viewpoint detecting camera and an image captured by the measuring camera, and then calculating a relative position and a relative orientation between the viewpoint detecting camera and the display device as orientation information. Furthermore, the method includes a step of adjusting a position of the virtual image displayed by the display device by using the orientation information.

The position adjustment method of a vehicle display device in the present disclosure can easily measure the relative orientation between the viewpoint detecting camera and the HUD, and adjust the display position of the HUD.

DETAILED DESCRIPTION

In the following, exemplary embodiments will be described in detail with reference to the accompanying drawings as appropriate. However, a detailed description more than necessary may be omitted. For example, a detailed description of the already well-known matters and a substantially overlapping description for the same configuration may be omitted. This is to prevent the following description from being unnecessarily redundant, and to facilitate the understanding of those skilled in the art.

It should be noted that the accompanying drawings and the following description are provided by the inventor(s) so that those skilled in the art fully understand the present disclosure, and that it is not intended by the inventor(s) to limit the subject matter described in the claims by the drawings and the description.

First Exemplary Embodiment

In the following, a first exemplary embodiment will be described with reference to FIGS. 1 to 7A, and 7B.

[1-1. Configuration]

[1-1-1. Device Configuration]

Figure 1:
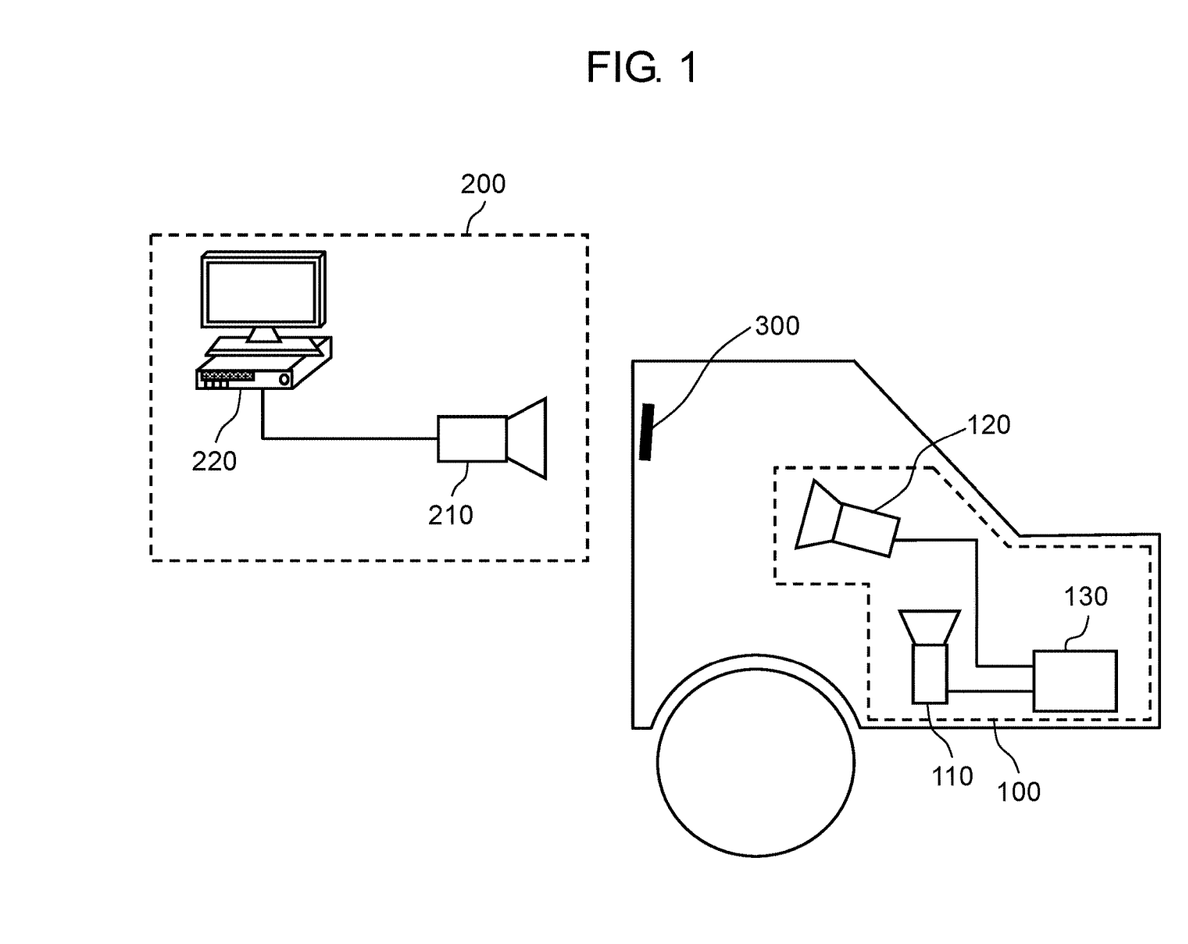
FIG. 1 is a block diagram illustrating a configuration example of a display position adjustment method in a first exemplary embodiment.

FIG. 1 is a schematic diagram for describing a position adjustment method of vehicle display device 100 in the first exemplary embodiment. As shown in FIG. 1, orientation determination device 200 and calibration pattern 300 are used for position adjustment of vehicle display device 100.

Vehicle display device 100 includes HUD 110, viewpoint detecting camera 120, and display control ECU (Electronic Control Unit) 130. HUD 110 displays a virtual image on a front field of view of a driver, and includes a head-up display. The present method is applicable to either of HUD 110 of a so-called windshield type and HUD 110 of a so-called combiner type.

Viewpoint detecting camera 120 captures an image of the face of the driver. The captured image is used for the viewpoint position measurement of the driver. Viewpoint detecting camera 120 includes a monocular camera and a stereo camera. In the present exemplary embodiment, the description is made on an assumption that a stereo camera is used. Viewpoint detecting camera 120 may be installed in any place as long as the face of the driver can be captured from a front direction as much as possible such as in a dashboard or in a meter.

Display control ECU 130 controls each component constituting vehicle display device 100, such as capturing of viewpoint detecting camera 120 and a display position of HUD 110.

Orientation determination device 200 includes measuring camera 210 and PC 220.

Measuring camera 210 is a camera installed in a vehicle only when the display position of the virtual image displayed by HUD 110 is adjusted. Measuring camera 210 captures calibration pattern 300 and the virtual image displayed by HUD 110. The measuring camera includes, for example, a combination of a stereo camera, a distance sensor, and the like.

PC 220 determines the orientation of HUD 110 from the image captured by measuring camera 210 and the image captured by viewpoint detecting camera 120. Calibration pattern 300 is installed in the vehicle only during the position adjustment.

[1-1-2. Functional Configuration]

Figure 2:
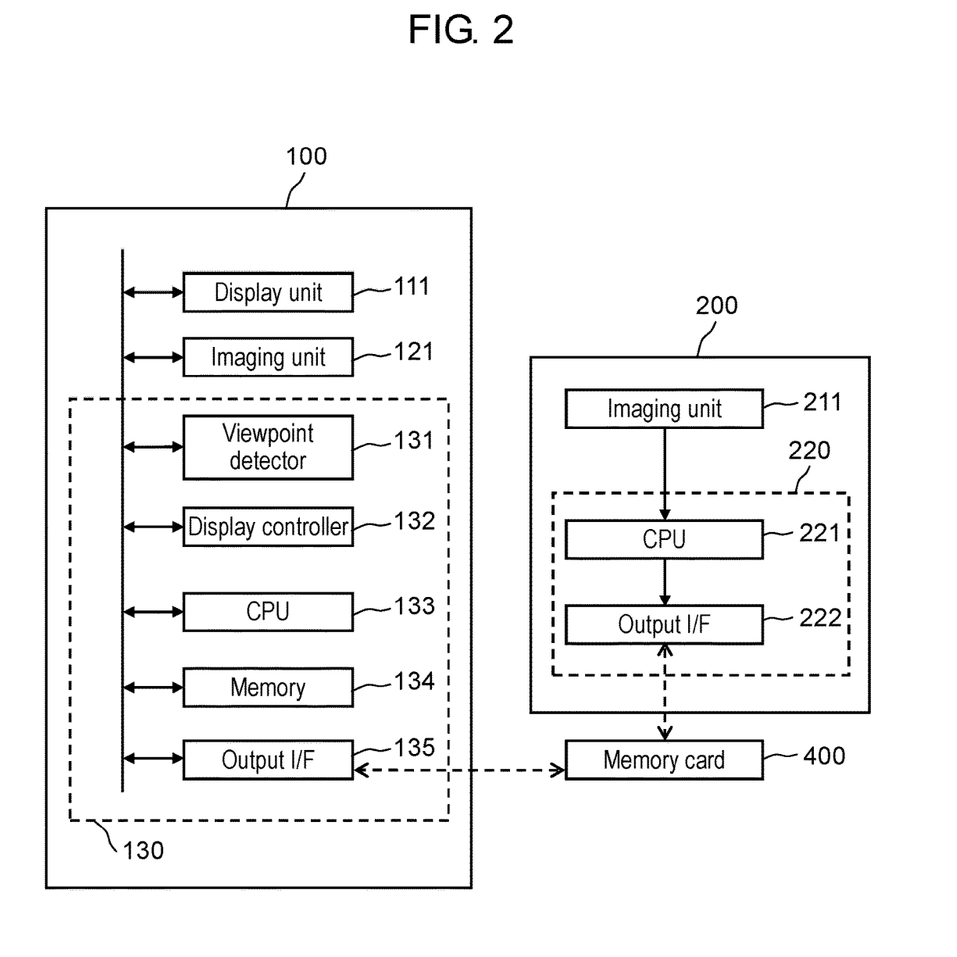
FIG. 2 is a functional block diagram illustrating a configuration example of the display position adjustment method in the first exemplary embodiment.

FIG. 2 is a functional block diagram of vehicle display device 100 and orientation determination device 200.

Vehicle display device 100 includes display unit 111 corresponding to HUD 110 in FIG. 1, imaging unit 121 corresponding to viewpoint detecting camera 120 in FIG. 1, and viewpoint detector 131 corresponding to display control ECU 130 in FIG. 1, display controller 132, CPU 133, memory 134, and output I/F 135. Orientation determination device 200 includes imaging unit 211 corresponding to measuring camera 210 in FIG. 1, and CPU 221 and output I/F 222 constituting PC 220 in FIG. 1. In addition, memory card 400 is used in exchange of data between vehicle display device 100 and orientation determination device 200 in the present exemplary embodiment.

Display unit 111 displays the virtual image on the field of view of the driver. Imaging unit 121 captures the image of the face of the driver, for example, at a rate of 30 frames per second for a predetermined period of time. It should be noted that imaging unit 121 is configured in combination with the distance sensor and the like.

Viewpoint detector 131 detects a viewpoint position of the driver from the image captured for a predetermined period of time by imaging unit 121. As for the detection of the viewpoint position, for example, parallax of viewpoint is obtained from the two images captured by imaging unit 121, whereby the three-dimensional position of the viewpoint can be obtained.

Display controller 132 controls the display position and the display contents of the virtual image displayed by display unit 111. In addition, display controller 132 controls the display position of display unit 111 in accordance with the orientation information calculated by orientation determination device 200.

CPU 133 is a controller for controlling the operation of entire vehicle display device 100. It should be noted that hardware such as Digital Signal Processor (DSP) and Field-Programmable Gate Array (FPGA) may be separately used for the detection of the viewpoint position.

Memory 134 is used for storing work memory of CPU 133, the image captured by imaging unit 121, the detection result of viewpoint detector 131, and the like. Memory 134 includes a volatile memory such as a DRAM and a non-volatile memory such as a flash memory.

Output I/F (Interface) 135 is used for outputting the image captured by imaging unit 121 to orientation determination device 200, and for inputting the orientation information from orientation determination device 200. Specifically, output I/F 135 is a memory card interface and the like used in the case of recording the image captured by imaging unit 121 in portable memory card 400, and reading the orientation information from memory card 400.

Imaging unit 211 is used for capturing calibration pattern 300 and the virtual image displayed by HUD 110.

CPU 221 is a controller for controlling each component constituting PC 220, and includes a non-volatile memory in which a program is stored, a non-volatile memory as a temporary storage region for executing the program, an input and output port, and a processor for executing the program. PC 220 determines the relative position and the orientation (relative orientation) between HUD 110 and viewpoint detecting camera 120 in FIG. 1 from the image captured by imaging unit 211 and the image captured by imaging unit 121 of vehicle display device 100, and calculates the orientation information for adjusting the display position of HUD 110.

Output I/F 222 is used for inputting the image captured by imaging unit 121 of vehicle display device 100, and outputting the orientation information calculated by CPU 221. Specifically, output I/F 222 is a memory card interface and the like used in the case of reading the image captured by imaging unit 121 from memory card 400, and recording the orientation information calculated by CPU 221 in memory card 400.

Memory card 400 is a portable recording medium, and is used for input and output of the image captured by imaging unit 121 and the orientation information calculated by orientation determination device 200.

[1-2. Operation]

Figure 3:
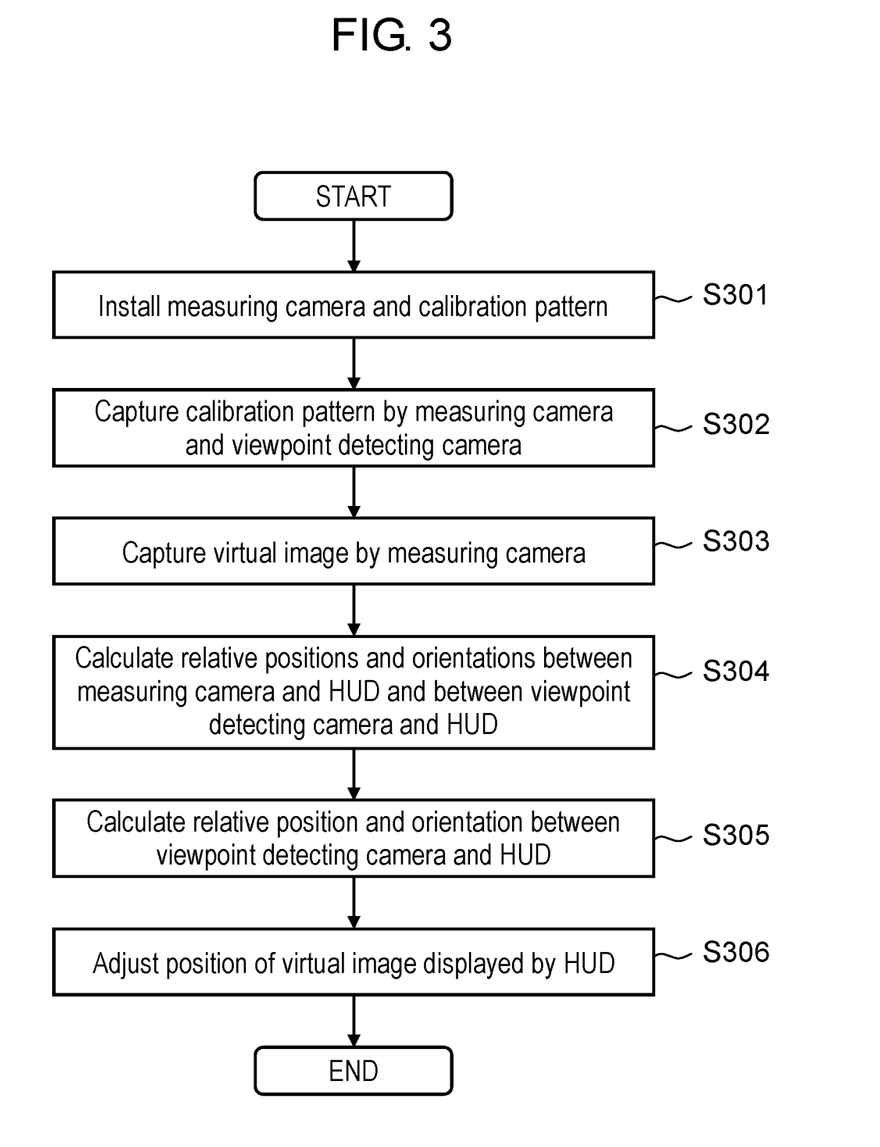
FIG. 3 is a flowchart illustrating a flow of processing of the position adjustment method in the first exemplary embodiment.
Figure 4:
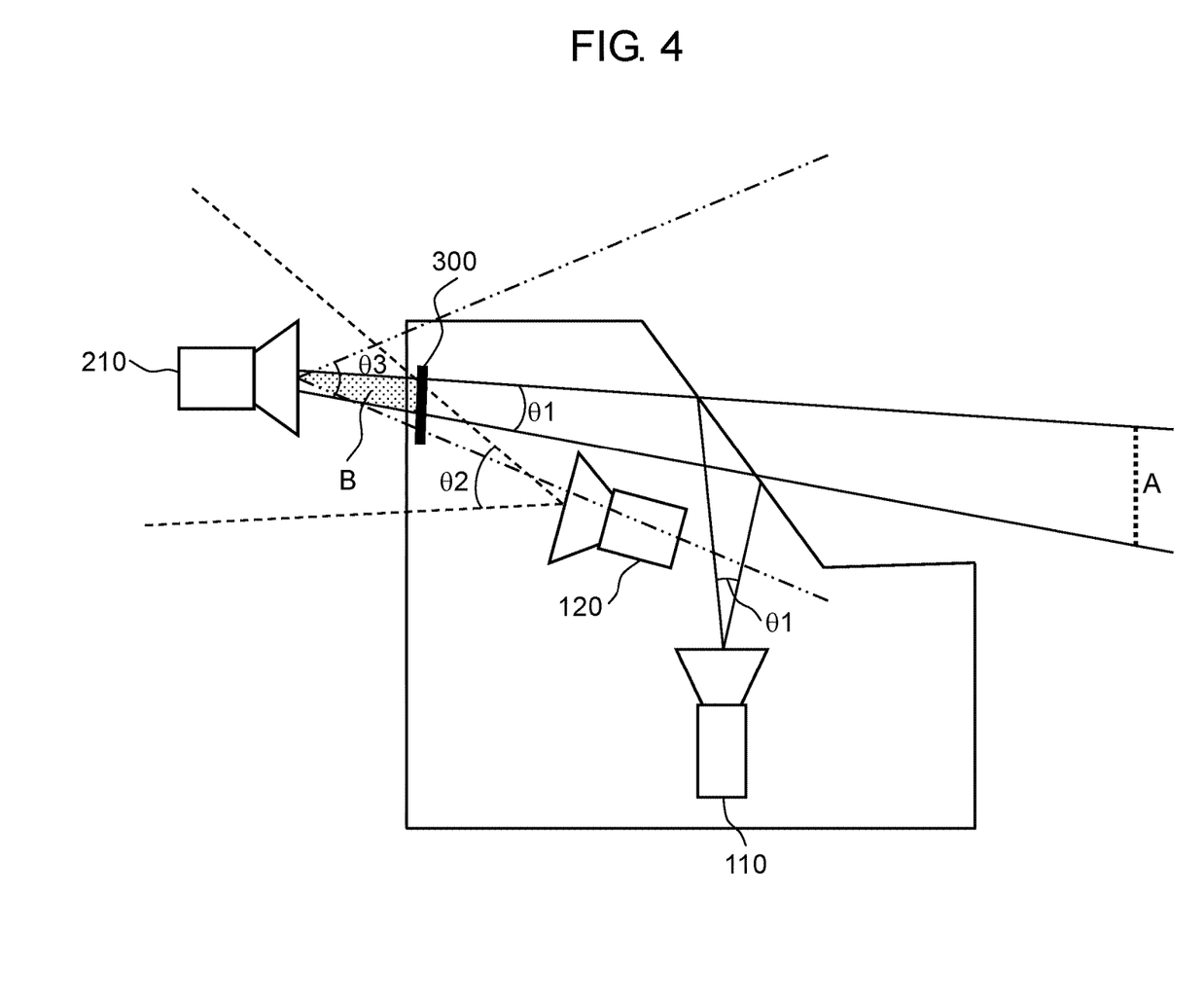
FIG. 4 is a diagram illustrating an installation example of a calibration pattern in the first exemplary embodiment.
Figure 5:
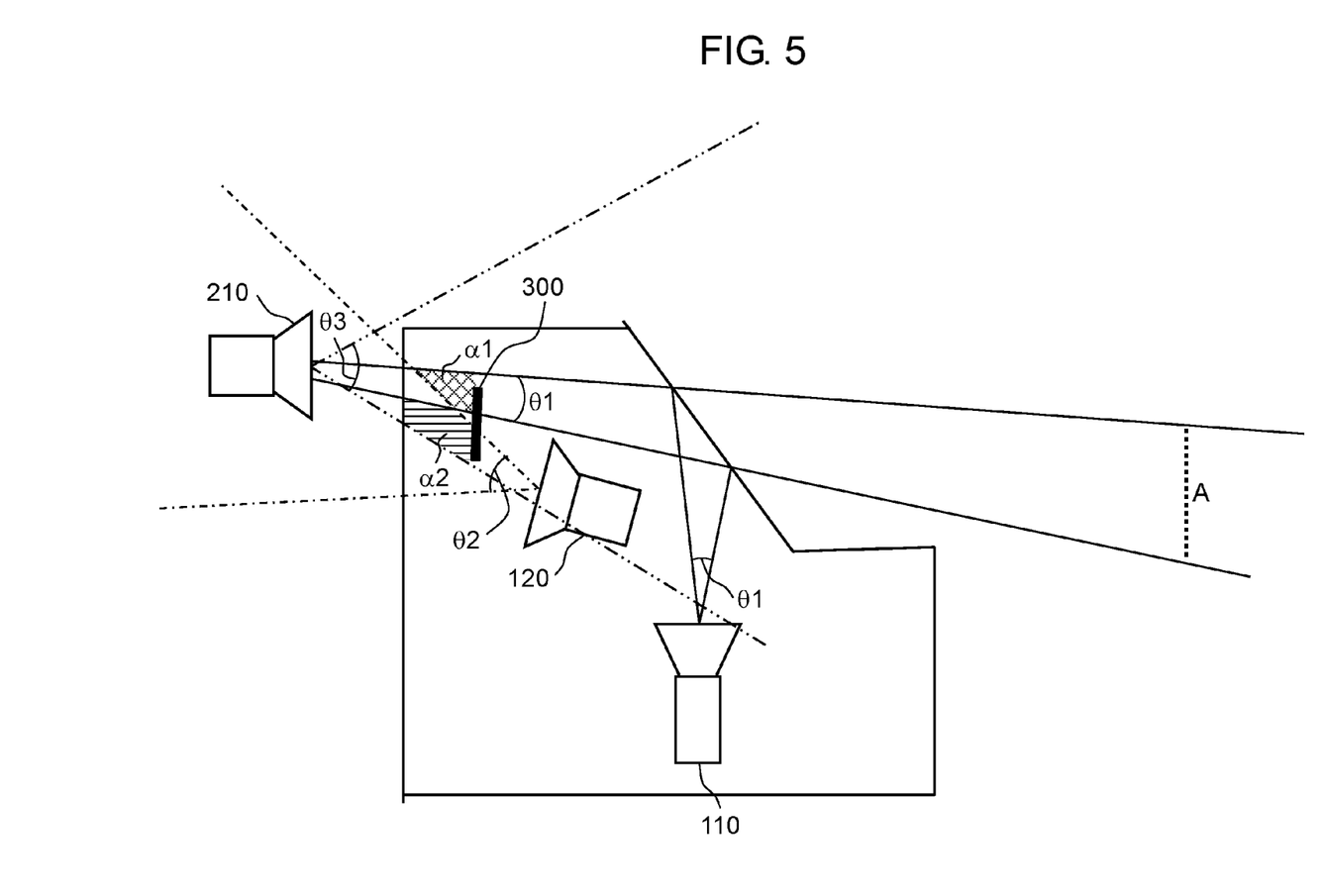
FIG. 5 is a diagram illustrating another installation example of the calibration pattern in the first exemplary embodiment.

FIG. 3 is a flowchart illustrating the flow of the processing of the position adjustment method in the present exemplary embodiment. FIG. 4 is a diagram illustrating an installation example of the calibration pattern in the present exemplary embodiment. FIG. 5 is a diagram illustrating another installation example of the calibration pattern in the present exemplary embodiment.

[1-2-1. Flow of Processing]

First, measuring camera 210 and calibration pattern 300 are installed in a predetermined position in the vehicle (step S301). Measuring camera 210 is installed in the position where the virtual image displayed by HUD 110 can be captured. The calibration pattern is disposed in a predetermined position with respect to the viewing angle of the virtual image and the angle of view of viewpoint detecting camera 120.

Specifically, calibration pattern 300 is desirably installed in range B (filled region) where three angles, i.e., viewing angle θ1 of virtual image A displayed by HUD 110, angle of view θ2 of the viewpoint detecting camera, and angle of view θ3 of the measuring camera overlap as shown in FIG. 4.

Here, depending on the specifications of HUD 110 and viewpoint detecting camera 120, it may be difficult to dispose calibration pattern 300 in the position as shown in FIG. 4. In such a case, as shown in FIG. 5, calibration pattern 300 may be disposed so as to spread across common range α1 to viewing angle θ1 of virtual image A displayed by HUD 110 and angle of view θ2 of measuring camera 210, and over common range α2 to angle of view θ3 of viewpoint detecting camera 120 and angle of view θ2 of measuring camera 210. Here, common range al is positioned outside angle of view θ2 of viewpoint detecting camera 120, and common range α2 is positioned outside viewing angle θ1 of virtual image A.

It should be noted that although calibration pattern 300 has a plate-like shape in FIGS. 4 and 5, the present disclosure is not limited thereto. As long as calibration pattern 300 has a known shape extending across common ranges α1, α2, any shape may be adopted. For example, as seen from measuring camera 210, calibration pattern 300 may have a shape in which depths of a portion located in region al and a portion located in region α2 are different from each other.

Next, calibration pattern 300 is captured by each of measuring camera 210 and viewpoint detecting camera 120 (step S302). CPU 133 of vehicle display device 100 causes viewpoint detecting camera 120 to capture calibration pattern 300, and causes memory 134 to record the captured image. Similarly, CPU 221 of orientation determination device 200 causes measuring camera 210 to capture calibration pattern 300.

When the capturing by viewpoint detecting camera 120 and measuring camera 210 ends, calibration pattern 300 is caused to move to the outside of viewing angle θ1 of virtual image A. Then, CPU 221 of orientation determination device 200 causes measuring camera 210 to capture virtual image A (step S303). At this time, as virtual image A, there is displayed virtual image A including the characteristic pattern capable of identifying which position of measuring camera 210 each pixel of virtual image A appears. Here, as an example of the characteristic pattern, a pattern where the color is different for each pixel, a pattern where the brightness and the color are changed for each pixel at a different timing, and the like can be considered.

Next, CPU 221 of orientation determination device 200 performs the calculation of the relative orientation between measuring camera 210 and viewpoint detecting camera 120, and the calculation of the relative orientation between measuring camera 210 and HUD 110 from the image captured by each of measuring camera 210 and viewpoint detecting camera 120 (step S304).

At this time, memory card 400 is connected to output I/F 135 of vehicle display device 100, and the image captured by viewpoint detecting camera 120, which is recorded in memory 134, is recorded in memory card 400. Then, memory card 400 is connected to the output I/F of orientation determination device 200. CPU 221 of orientation determination device 200 reads the image captured by viewpoint detecting camera 120 from memory card 400. CPU 221 calculates the relative orientation of viewpoint detecting camera 120 with respect to measuring camera 210 and calculates the relative orientation of HUD 110 with respect to measuring camera 210 by using the image captured by viewpoint detecting camera 120 and the image captured by measuring camera 210.

CPU 221 of orientation determination device 200 calculates the relative orientation of HUD 110 with respect to viewpoint detecting camera 120 from the relative orientations of viewpoint detecting camera 120 and HUD 110 with respect to measuring camera 210 (step S305). CPU 221 records the calculation results in memory card 400 through output I/F 222 of orientation determination device 200 as the orientation information.

CPU 133 of vehicle display device 100 reads the orientation information calculated by orientation determination device 200 from memory card 400 through output I/F 135 of vehicle display device 100 so as to cause memory 134 to record. CPU 133 causes display controller 132 to adjust the display position of the virtual image displayed by HUD 110 in accordance with the recorded orientation information (step S306).

[1-2-2. Measurement of Relative Orientation Between Measuring Camera and Viewpoint Detecting Camera]

Here, the calculation method of the orientation information calculated by orientation determination device 200 will be described in detail.

First, "a three-dimensional coordinate system configured by viewpoint detecting camera 120" is converted into "a three-dimensional coordinate system configured by measuring camera 210". The conversion is expressed by (Mathematical Formula 1).

$$\begin{pmatrix} x_w \\ y_w \\ z_w \\ 1 \end{pmatrix} = \begin{pmatrix} Rc_{11} & Rc_{12} & Rc_{13} & tc_x \\ Rc_{21} & Rc_{22} & Rc_{23} & tc_y \\ Rc_{31} & Rc_{32} & Rc_{33} & tc_z \\ 0 & 0 & 0 & 1 \end{pmatrix} \begin{pmatrix} x_c \\ y_c \\ z_c \\ 1 \end{pmatrix}$$ [Mathematical Formula 1]

In (Mathematical Formula 1), $(x_w, y_w, z_w)$ represents the coordinates of a point P on the three-dimensional coordinate system configured by measuring camera 210, and $(x_c, y_c, z_c)$ represents the coordinates of when the point P is viewed in the three-dimensional coordinate system configured by viewpoint detecting camera 120. In addition, $R_{c11}$ from $R_{c33}$ corresponds to the rotation of the coordinate system, and $(t_{cx}, t_{cy}, t_{cz})$ corresponds to the parallel movement amount of the origin of the coordinate system. Here, obtaining the values of nine variables of rotation $R_c$ of the coordinate system, and three variables of parallel movement amount $t_c$ of the coordinate system origin, totaling 12 variables corresponds to obtaining the relative orientation between measuring camera 210 and viewpoint detecting camera 120.

In the following, the method for obtaining rotation $R_c$ and parallel movement amount $t_c$ will be described.

Assume that the results of the measurement of the coordinates of the n points on calibration pattern 300 by measuring camera 210 are $(x_{w1}, y_{w1}, z_{w1})$, $(x_{w2}, y_{w2}, z_{w2})$, ..., $(x_{wn}, y_{wn}, z_{wn})$. In addition, assume that the results of the measurement of the coordinates of the n points on calibration pattern 300 by viewpoint detecting camera 120 are $(x_{c1}, y_{c1}, z_{c1})$, $(x_{c2}, y_{c2}, z_{c2})$, ..., $(x_{cn}, y_{cn}, z_{cn})$. Focusing on the first row portion of the matrix among the results obtained by substituting these in (Mathematical Formula 1) yields (Mathematical Formula 2).

$$x_{w1} = Rc_{11}x_{c1} + Rc_{12}y_{c1} + Rc_{13}z_{c1} + tc_x$$

$$x_{w2} = Rc_{11}x_{c2} + Rc_{12}y_{c2} + Rc_{13}z_{c2} + tc_x$$

$$x_{wn} = Rc_{11}x_{cn} + Rc_{12}y_{cn} + Rc_{13}z_{cn} + tc_x \quad \text{[Mathematical Formula 2]}$$

In (Mathematical Formula 2), four unknowns are $R_{c11}$, $R_{c12}$, $R_{c13}$, and $t_{cx}$, and therefore if a set of coordinates of at least four points is obtained, this equation can be solved. Actually, more than four points are measured in view of the influence of measurement error in the camera, and the value of each unknown is determined by a method such as the least squares method so that the total error is minimized. The values of the unknowns can be determined in the same manner also for the second row portion and the third row portion of the matrix, and therefore the description thereof will be omitted.

[1-2-3. Measurement of Relative Orientation Between Measuring Camera and HUD]

First, for n points on calibration pattern 300, three-dimensional positions $(x_{w1}, y_{w1}, z_{w1})$, $(x_{w2}, y_{w2}, z_{w2})$, ..., $(x_{wn}, y_{wn}, z_{wn})$ in the coordinate system of the measuring camera 210, and the coordinates on the image $(u_{w1}, v_{w1})$, $(u_{w2}, v_{w2})$, ..., $(u_{wn}, v_{wn})$ are obtained. Subsequently, which pixel of the virtual image of HUD 110 appears in the positions of $(u_{w1}, v_{w1})$, $(u_{w2}, v_{w2})$, ..., $(u_{wn}, v_{wn})$ is determined from the image obtained by capturing of the virtual image displayed by HUD 110. In the following, assume that the determined coordinates of the pixels of HUD 110 are $(u_{h1}, v_{h1})$, $(u_{h2}, v_{h2})$, ..., $(u_{hn}, v_{hn})$.

Here, although if the three-dimensional position of the pixel of HUD 110 is known, it can be treated in the same manner as viewpoint detecting camera 120, when the viewpoint position is changed, distortion occurs in the shape of the virtual image of HUD 110 under the influence of the windshield and the combiner shape, and there is a possibility that the correct three-dimensional position cannot be measured in the stereo matching. In addition, if the range where the virtual image can be observed is narrow, there is a possibility that the virtual image cannot be observed by both eyes of the stereo camera. Therefore, the three-dimensional position of the virtual image is determined by the following methods.

Specifically, when the optical center position and the direction of the optical axis of HUD 110, that is, the relative orientation with respect to measuring camera 210 is assumed, where the virtual image is projected as viewed from measuring camera 210 is uniquely determined from the design specifications of HUD 110. Therefore, it can be found that it is only necessary to determine whether or not the assumed orientation is correct. In the following, the method for determining whether or not the assumed orientation is correct will be described.

When the pixels of HUD 110 $(u_{h1}, v_{h1})$, $(u_{h2}, v_{h2})$, ..., $(u_{hn}, v_{hn})$ are projected into space in a certain orientation, assume that the three-dimensional coordinates in the coordinate system of measuring camera 210 are respectively $(x_{h1}, y_{h1}, z_{h1})$, $(x_{h2}, y_{h2}, z_{h2})$, $(x_{hn}, y_{hn}, z_{hn})$. If the orientation is correct, as in FIG. 6A, straight line L1 connecting $(x_{w1}, y_{w1}, z_{w1})$ and $(x_{h1}, y_{h1}, z_{h1})$, straight line L2 connecting $(x_{w2}, y_{w2}, z_{w2})$ and $(x_{h2}, y_{h2}, z_{h2})$, ..., and straight line L3 connecting $(x_{wn}, y_{wn}, z_{wn})$ and $(x_{hn}, y_{hn}, z_{hn})$ intersect at one point P. This is obvious because each point is the points appearing in the same pixel on the image of measuring camera 210.

Figure 6A:
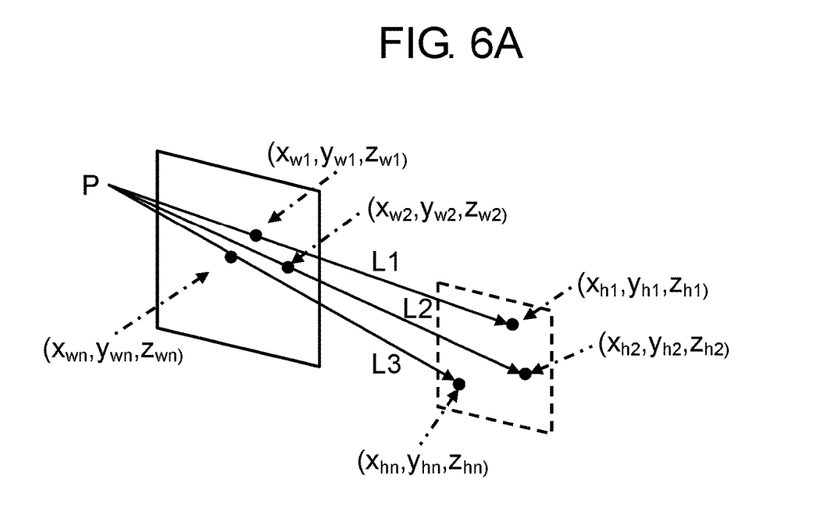
FIG. 6A is a diagram illustrating a relative orientation between a measuring camera and a HUD.
Figure 6B:
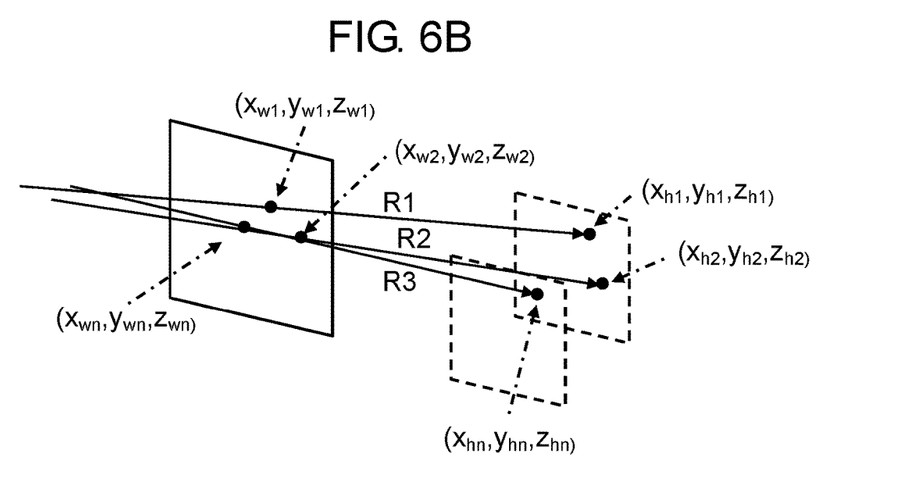
FIG. 6B is a diagram illustrating a relative orientation between the measuring camera and the HUD.

On the other hand, if the orientation is not correct, as in FIG. 6B, each straight line R1, R2, and R3 does not intersect at one point. Coordinates (X, Y, Z) of the point where the distance from each of the straight lines is minimized can be obtained by determining the parameter $t_i$ (i=1 ... n) to minimize the D of the following (Mathematical Formula 3).

$$D = \sum_{i=1}^{n} \{(X - (t_i v_{xi} + x_{wi}))^2 + (Y - (t_i v_{yi} + y_{wi}))^2 + (Z - (t_i v_{zi} + z_{wi}))^2\} \quad \text{[Mathematical Formula 3]}$$

$$v_{xi} = \frac{x_{wi} - x_{hi}}{\sqrt{(x_{wi} - x_{hi})^2 + (y_{wi} - y_{hi})^2 + (z_{wi} - z_{hi})^2}}$$

$$v_{yi} = \frac{y_{wi} - y_{hi}}{\sqrt{(x_{wi} - x_{hi})^2 + (y_{wi} - y_{hi})^2 + (z_{wi} - z_{hi})^2}}$$

$$v_{zi} = \frac{z_{wi} - z_{hi}}{\sqrt{(x_{wi} - x_{hi})^2 + (y_{wi} - y_{hi})^2 + (z_{wi} - z_{hi})^2}}$$

Here, $t_i$ can be obtained by a method such as the least squares method, and therefore, after $t_i$ is determined, the orientation from which $(x_{h1}, y_{h1}, z_{h1})$, $(xh_2, y_{h2}, z_{h2})$, ..., $(x_{hn}, y_{hn}, z_{hn})$, such as to minimize the value itself of D of (Mathematical Formula 3), can be obtained is determined by the same method such as the least squares method, whereby the correct orientation can be obtained. Finally, (Mathematical Formula 4) for converting the three-dimensional position $(x_h, y_h, z_h)$ in the coordinate system of HUD 110 into the three-dimensional position $(x_w, y_w, z_w)$ in the coordinate system of the measuring camera can be obtained.

$$\begin{pmatrix} x_w \\ y_w \\ z_w \\ 1 \end{pmatrix} = \begin{pmatrix} Rh_{11} & Rh_{12} & Rh_{13} & th_x \\ Rh_{21} & Rh_{22} & Rh_{23} & th_y \\ Rh_{31} & Rh_{32} & Rh_{33} & th_z \\ 0 & 0 & 0 & 1 \end{pmatrix} \begin{pmatrix} x_h \\ y_h \\ z_h \\ 1 \end{pmatrix} \quad \text{[Mathematical Formula 4]}$$

At the end, the relative orientation of HUD 110 with respect to viewpoint detecting camera 120 is calculated from the relative orientations of viewpoint detecting camera 120 and HUD 110 with respect to measuring camera 210 obtained in step S304 in FIG. 3 (step S305). Specifically, $(x_w, y_w, z_w)$ is erased from Mathematical Formula 1) and (Mathematical Formula 4), and the following (Mathematical Formula 5) is obtained.

$$\begin{pmatrix} x_h \\ y_h \\ z_h \\ 1 \end{pmatrix} = \begin{pmatrix} Rh_{11} & Rh_{12} & Rh_{13} & th_x \\ Rh_{21} & Rh_{22} & Rh_{23} & th_y \\ Rh_{31} & Rh_{32} & Rh_{33} & th_z \\ 0 & 0 & 0 & 1 \end{pmatrix}^{-1}$$ [Mathematical Formula 5]

$$\begin{pmatrix} Rc_{11} & Rc_{12} & Rc_{13} & tc_x \\ Rc_{21} & Rc_{22} & Rc_{23} & tc_y \\ Rc_{31} & Rc_{32} & Rc_{33} & tc_z \\ 0 & 0 & 0 & 1 \end{pmatrix} \begin{pmatrix} x_c \\ y_c \\ z_c \\ 1 \end{pmatrix}$$

The matrix part in (Mathematical Formula 5) represents the relative orientation of the HUD with respect to the viewpoint detecting camera. That is, the matrix portion of (Mathematical Formula 5) corresponds to the orientation information. CPU 133 of vehicle display device 100 performs the operation for converting the three-dimensional position of the viewpoint of the driver obtained by viewpoint detecting camera 120 into the three-dimensional position in the coordinate system of HUD 110. Display controller 132 adjusts the display position of HUD 110 in accordance with the operation results of CPU 133.

[1-3. Conclusion]

The display position adjustment method of the present exemplary embodiment installs measuring camera 210 in the position capable of capturing calibration pattern 300 for acquiring the information for the virtual image and position adjustment, and disposes calibration pattern 300 in a predetermined position with respect to viewing angle θ1 of the virtual image, angle of view θ2 of the viewpoint detecting camera, and angle of view θ3 of the measuring camera in vehicle display device 100 including HUD 110 for displaying the virtual image on the front field of view of the driver, and viewpoint detecting camera 120 for capturing the image of the driver. Next, calibration pattern 300 is captured by viewpoint detecting camera 120 and measuring camera 210, and the virtual image is captured by measuring camera 210. Next, the relative position and orientation between viewpoint detecting camera 120 and HUD 110 are calculated as the orientation information after the calculation of the relative position and orientation between measuring camera 210 and viewpoint detecting camera 120, and the calculation of the relative position and orientation between measuring camera 210 and HUD 110 are performed by using the image captured by viewpoint detecting camera 120 and the image captured by measuring camera 210. The position of the virtual image displayed by HUD 110 is adjusted by using the calculated orientation information.

As a result, the relative orientation between HUD 110 and viewpoint detecting camera 120 can be easily measured.

Therefore, the display position adjustment of HUD 110 can be easily performed.

Figure 7A:
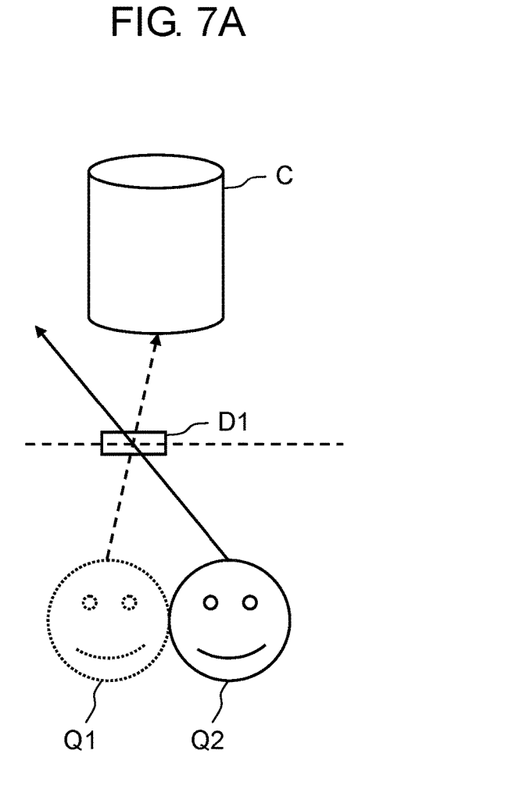
FIG. 7A is a diagram illustrating an adjustment example of a display position.
Figure 7B:
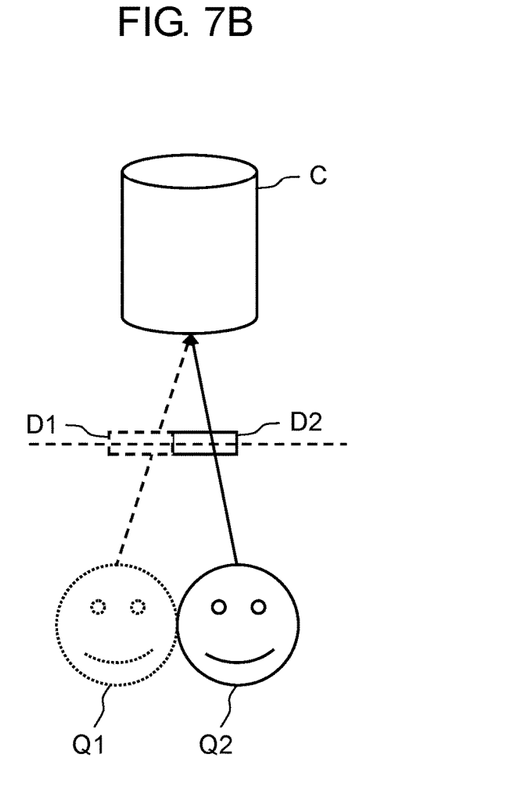
FIG. 7B is a diagram illustrating an adjustment example of the display position.

For example, in PTL 1, both of the viewpoint detecting camera and the HUD have error factors such as the unevenness at the time of assembly and the displacement at the time of mounting to the vehicle body, and there is a high possibility that the position relationship between the two is different from the assumption at the time of design. Therefore, as shown in FIG. 7A, a displacement occurs between measured viewpoint position Q1 and viewpoint position Q2 at the time of design. In this case, even if virtual image I is displayed so as to overlap object C as seen from viewpoint position Q1, virtual image I cannot be seen from true viewpoint position Q2 because virtual image I overlaps with object C. On the contrary, when the technique in the present disclosure is applied, the true viewpoint position Q2 can be calculated from measured viewpoint position Q1, and therefore, as shown in FIG. 7B, virtual image D2 can be displayed in the position overlapping object C as seen from viewpoint position Q2.

Second Exemplary Embodiment

Although in the first exemplary embodiment, the calibration pattern is a separate body from any of the viewpoint detecting camera and the measuring camera, even if the calibration pattern is attached to the measuring camera, the calibration can be performed in accordance with the following procedure. It should be noted that the configuration of the devices in the second exemplary embodiment overlaps with that in the first exemplary embodiment, and therefore the description will be omitted. In addition, the description of the same portions as in the first exemplary embodiment will be also omitted.

[2-1. Operaton]

Figure 8:
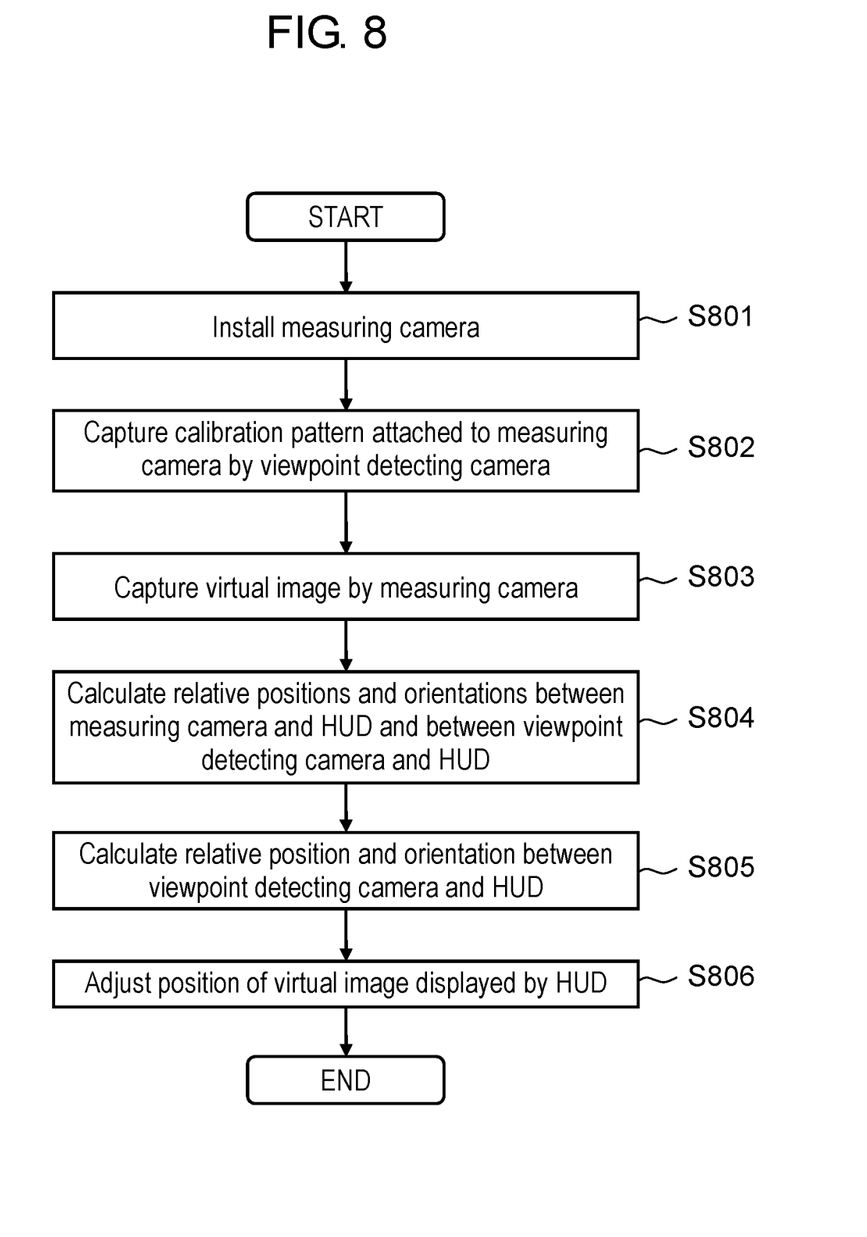
FIG. 8 is a flowchart illustrating a flow of processing of a position adjustment method in a second exemplary embodiment.
Figure 9:
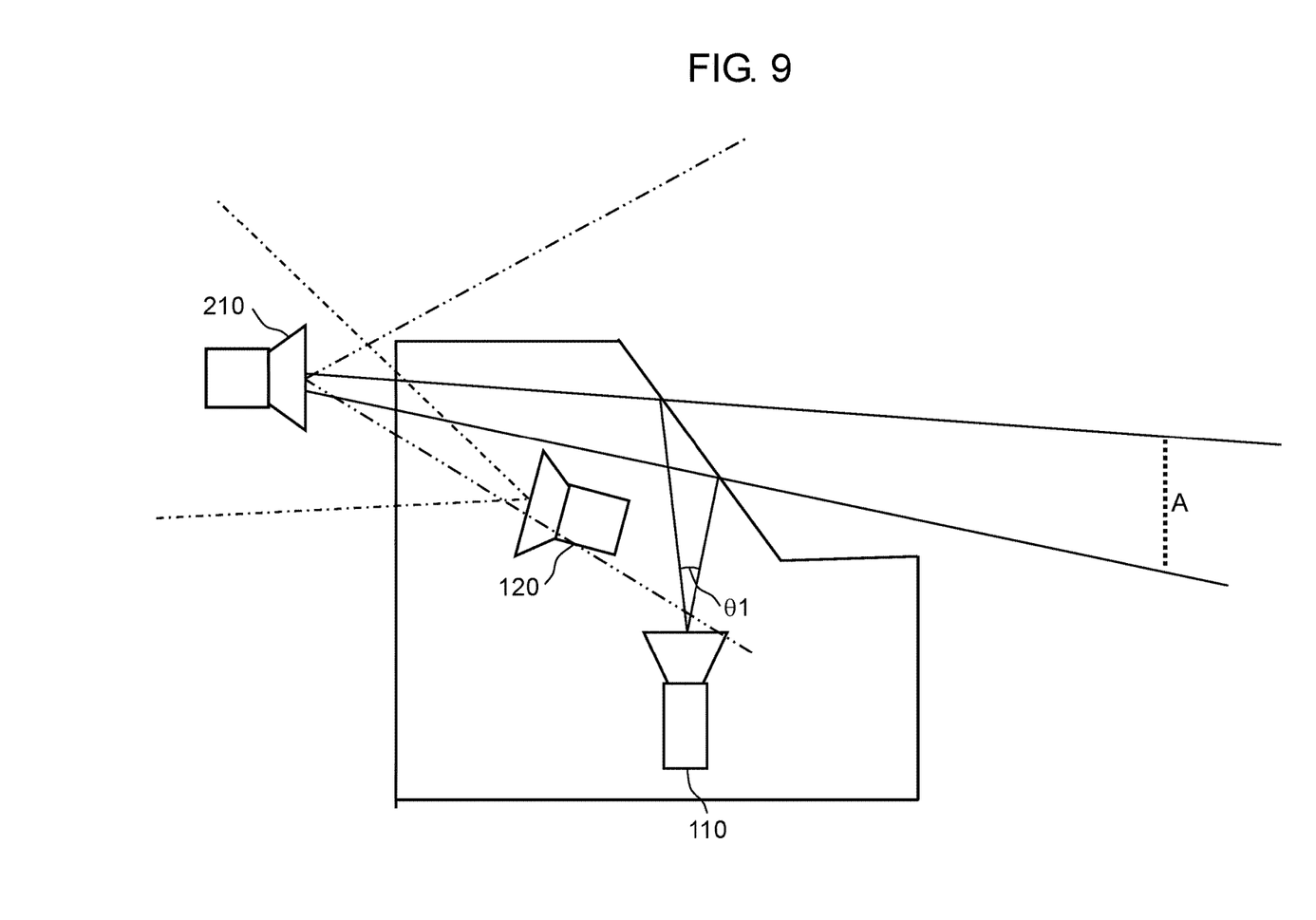
FIG. 9 is a diagram illustrating an example of an installation position of a calibration pattern in the second exemplary embodiment.

FIG. 8 is a flowchart illustrating the flow of the processing of the position adjustment method in the present exemplary embodiment. FIG. 9 is a diagram illustrating an installation example of the calibration pattern in the present exemplary embodiment.

[2-1-1. Flow of Processing]

The flow of the processing is substantially the same as the flow of the processing in the first exemplary embodiment shown in FIG. 3. A big difference is in step S802, and the calibration pattern is attached to the measuring camera, and therefore the calibration pattern is captured only by viewpoint detecting camera 120. The calibration pattern is required to have a shape such as to fit in the angle of view of viewpoint detecting camera 120 as shown in FIG. 9. It should be noted that, although in FIG. 9, the calibration pattern is attached to the lower portion of measuring camera 210, its specific position does not have to be necessarily the same as in this figure, and for example, the calibration pattern may be attached to the upper portion of measuring camera 210, or to a plurality of portions.

[2-1-2. Measurement of Relative Orientation Between Measuring Camera and Viewpoint Detecting Camera]

In the same manner as in the first exemplary embodiment, first, "the three-dimensional coordinate system configured by viewpoint detecting camera 120" is converted into "the three-dimensional coordinate system configured by measuring camera 210". In general, to perform the conversion between coordinate systems, it is necessary to determine the position of the origin of the coordinate system to be converted and the direction of the coordinate system. Specifically, the following (Mathematical Formula 6) holds between the position (x, y, z) in the coordinate system before conversion and the position (x1, y1, z1) in the coordinate system after conversion.

$$\begin{pmatrix} x1 \\ y1 \\ z1 \\ 1 \end{pmatrix} = \begin{pmatrix} R_{11} & R_{12} & R_{13} & t_x \\ R_{21} & R_{22} & R_{23} & t_y \\ R_{31} & R_{32} & R_{33} & t_z \\ 0 & 0 & 0 & 1 \end{pmatrix} \begin{pmatrix} x \\ y \\ z \\ 1 \end{pmatrix}$$ [Mathematical Formula 6]

$R_{11}$ to $R_{33}$ constitute the matrix representing the rotation of the coordinate system, and can be easily obtained if the direction of the coordinate system after conversion is known. Here, $(t_x, t_y, t_z)$ corresponds to the parallel movement amount of the origin of the coordinate system.

Figure 10A:
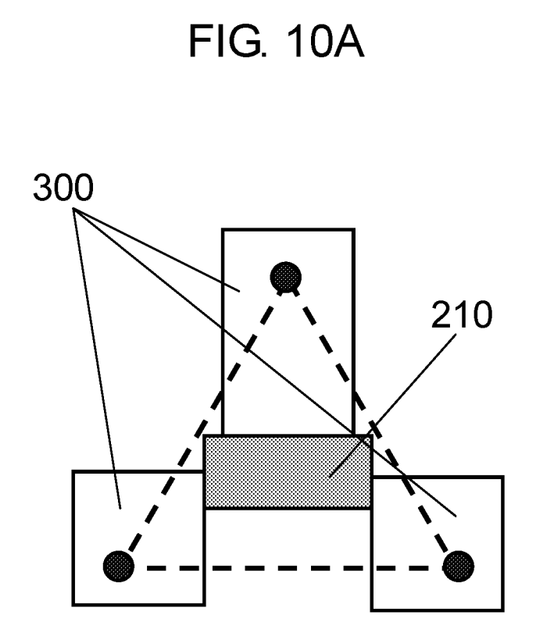
FIG. 10A is a diagram illustrating an example of a shape of the calibration pattern in the second exemplary embodiment.
Figure 10B:
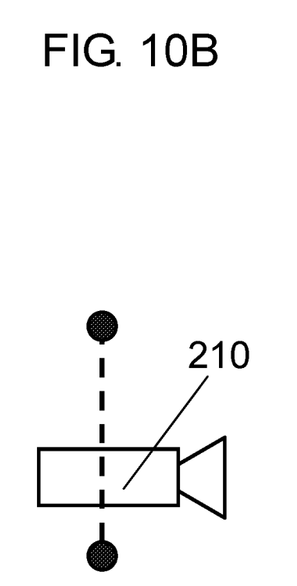
FIG. 10B is a diagram illustrating an example of a shape of the calibration pattern in the second exemplary embodiment.

As a method for obtaining the origin position and direction of the three-dimensional coordinate system constituted by measuring camera 210, for example, as shown in FIGS. 10A and 10B, three points are disposed in an equilateral triangle as calibration pattern 300, and calibration pattern 300 is disposed so that the optical center of measuring camera 210 (the origin of three-dimensional coordinate system constituted by measuring camera 210) is positioned in the center of gravity of the equilateral triangle, and the three-dimensional coordinates of the three points of calibration pattern 300 are measured by viewpoint detecting camera 120. As a result, the center of gravity of the measured three-dimensional coordinates represents the position of the optical center of measuring camera 210, and the normal direction of the plane determined from the three-dimensional coordinates of the three points represents the direction of measuring camera 210.

It should be noted that the examples of the calibration pattern are not limited to those shown in FIGS. 10A and 10B, and any pattern may be used in which the position is known with respect to the optical center of measuring camera 210, and the direction of measuring camera 210 can be defined, that is, the coordinates of three or more points not in the same straight line can be defined.

[2-1-3. Measurement of Relative Orientation Between Measuring Camera and HUD]

When calibration pattern 300 exists in the angle of view of measuring camera 210 and in the viewing angle of the virtual image of HUD 110, the method used in the first embodiment can be used as it is. If this condition is not satisfied, the relative orientation between the measuring camera and the HUD is measured in the following manner.

As mentioned in the description of the first exemplary embodiment, when the optical center position and the direction of the optical axis of HUD 110, that is, the relative orientation with respect to measuring camera 210 is assumed, where the virtual image is projected as viewed from measuring camera 210 is uniquely determined from the design specifications of HUD 110. For n pixels (where n≥3, and at least one pixel is not collinear) in the virtual image, the positions $(u_1, v_1), (u_2, v_2), \ldots, (u_n, v_n)$ on the image of measuring camera 210 are calculated when HUD 110 is in a certain orientation. From this and the position $(u1_1, v1_1), (u1_2, v1_2), \ldots, (u1_n, v1_n)$ on the image of each pixel on the image actually captured by measuring camera 210, the orientation of HUD where the value D1 shown in the following (Mathematical Formula 7) becomes the minimum is calculated.

$$D1 = \sum_{i=1}^{n} \{(u_i - u1_i)^2 + (v_i - v1_i)^2\}$$ [Mathematical Formula 7]

The minimization of D1 can be performed by using a numerical calculation algorithm such as the Newton's method or a probabilistic algorithm such as simulated annealing.

[2-2. Conclusion]

If the relative orientation between the measuring camera and the viewpoint detecting camera and the relative orientation between the measuring camera and the HUD can be determined in the manner as described above, both can be tied, and the relative orientation between the viewpoint detecting camera and the HUD can be measured under the same concept as in the first embodiment.

Other Exemplary Embodiments

As described above, the exemplary embodiments are described as examples of the technique disclosed in the present application. However, the technique in the present disclosure is not limited thereto, and can also be appropriately applied to the exemplary embodiments where changes, substitutions, additions, omission, and the like are performed. In addition, it is also possible to combine each of the components described in the exemplary embodiments into a new exemplary embodiment.

Therefore, in the following, other exemplary embodiments will be illustrated.

For example, a translucent object may be used as the calibration pattern. This can eliminate the need to install and move the calibration pattern when the virtual image of the HUD is captured so as to shorten the operation time.

In addition, in the position adjustment method described in the above exemplary embodiments, each block may be individually made into a single chip by a semiconductor device such as an LSI, or may be made into a single chip so as to include a part or the whole.

It should be noted that although the LSI is mentioned here, the LSI is sometimes referred to as an IC, a system LSI, a super LSI, and an ultra LSI depending on the degree of integration.

In addition, the method of circuit integration is not limited to the LSI, and may be achieved by a dedicated circuit or a general-purpose processor.

After the LSI manufacture, a programmable FPGA (Field Programmable Gate Array) or a reconfigurable processor capable of reconfiguring the connections and settings of the circuit cells in the LSI may be used.

Furthermore, if an integrated circuit technique replacing the LSI appears due to the advances in semiconductor technique or a derived different technique, the integration of the functional blocks may be performed by naturally using the technique. The application of biotechnology and the like may be performed.

In addition, each piece of processing of the above-described embodiments may be achieved by hardware, or may be achieved by software. Furthermore, each piece of processing may be achieved by the mixed processing of software and hardware. Needless to say, it should be noted that when the digital camera according to the above embodiments is achieved by hardware, it is necessary to perform timing adjustment for performing each piece of processing. In the above embodiments, details of timing adjustment of various signals occurring in the actual hardware design are omitted for ease of explanation.

As described above, the exemplary embodiments are described as examples of the technique in the present disclosure. For this purpose, the accompanying drawings and the detailed description are provided.

Therefore, among the components described in the accompanying drawings and detailed description, not only the components essential for solving the problem, but also the non-essential components for solving the problem may be included so as to illustrate the above technique. Therefore, it should not be determined that these non-essential components are essential only because these non-essential components are described in the accompanying drawings and the detailed description.

In addition, the embodiments described above are intended to illustrate the techniques in the present disclosure, and therefore various changes, substitutions, additions, omission, and the like can be performed within the scope of the claims or their equivalents.

What is claimed is:

1. A position adjustment method of a vehicle display device including:
    a display device configured to display a virtual image on a front field of view of a driver, and
    a viewpoint detecting camera configured to capture an image of the driver, the method comprising:
    installing a measuring camera in a position at which a calibration pattern for acquiring information for the virtual image and position adjustment can be captured, and disposing the calibration pattern in a predetermined position with respect to a viewing angle of the virtual image, an angle of view of the viewpoint detecting camera, and an angle of view of the measuring camera;
    capturing the calibration pattern by the viewpoint detecting camera and the measuring camera;
    capturing the virtual image by the measuring camera;
    calculating a relative position and a relative orientation between the measuring camera and the viewpoint detecting camera, and calculating a relative position and a relative orientation between the measuring camera and the display device by using an image captured by the viewpoint detecting camera and an image captured by the measuring camera, and calculating a relative position and a relative orientation between the viewpoint detecting camera and the display device from the two relative positions and orientations as orientation information; and
    adjusting a position of the virtual image displayed by the display device by using the orientation information.

2. The position adjustment method of a vehicle display device according to claim 1, further comprising disposing the calibration pattern within a range where the viewing angle of the virtual image, the angle of view of the viewpoint detecting camera, and the angle of view of the measuring camera overlap.

3. The position adjustment method of a vehicle display device according to claim 2,
    wherein in the calculating of the relative position and the relative orientation between the viewpoint detecting camera and the display device, the virtual image displayed by the display device includes a characteristic pattern for identifying which pixel of the virtual image appears in which pixel of an image captured by the measuring camera.

4. The position adjustment method of a vehicle display device according to claim 3, wherein the characteristic pattern for identifying the pixel is a pattern in which a color and brightness are temporally changed.

5. The position adjustment method of a vehicle display device according to claim 2, wherein the calibration pattern is translucent.

6. The position adjustment method of a vehicle display device according to claim 5,
    wherein in the calculating of the relative position and the relative orientation between the viewpoint detecting camera and the display device, the virtual image displayed by the display device includes a characteristic pattern for identifying which pixel of the virtual image appears in which pixel of an image captured by the measuring camera.

7. The position adjustment method of a vehicle display device according to claim 6, wherein the characteristic pattern for identifying the pixel is a pattern in which a color and brightness are temporally changed.

8. The position adjustment method of a vehicle display device according to claim 1, further comprising disposing the calibration pattern extending across a region within a range where the viewing angle of the virtual image and the angle of view of the measuring camera overlap, the region being outside the angle of view of the viewpoint detecting camera and a region within a range where the angle of view of the viewpoint detecting camera and the angle of view of the measuring camera overlap, the region being outside a range of the viewing angle of the virtual image.

9. The position adjustment method of a vehicle display device according to claim 8, wherein the calibration pattern is translucent.

10. The position adjustment method of a vehicle display device according to claim 8,
    wherein in the calculating of the relative position and the relative orientation between the viewpoint detecting camera and the display device, the virtual image displayed by the display device includes a characteristic pattern for identifying which pixel of the virtual image appears in which pixel of an image captured by the measuring camera.

11. The position adjustment method of a vehicle display device according to claim 10, wherein the characteristic pattern for identifying the pixel is a pattern in which a color and brightness are temporally changed.

12. The position adjustment method of a vehicle display device according to claim 8,
    wherein in the calculating of the relative position and the relative orientation between the viewpoint detecting camera and the display device, the virtual image displayed by the display device includes a characteristic pattern for identifying which pixel of the virtual image appears in which pixel of an image captured by the measuring camera.

13. The position adjustment method of a vehicle display device according to claim 12, wherein the characteristic pattern for identifying the pixel is a pattern in which a color and brightness are temporally changed.

14. The position adjustment method of a vehicle display device according to claim 1,
    wherein in the calculating of the relative position and the relative orientation between the viewpoint detecting camera and the display device, the virtual image displayed by the display device includes a characteristic pattern for identifying which pixel of the virtual image appears in which pixel of an image captured by the measuring camera.

15. The position adjustment method of a vehicle display device according to claim 14, wherein the characteristic pattern for identifying the pixel is a pattern in which a color and brightness are temporally changed.

16. A position adjustment method of a vehicle display device including:
    a display device configured to display a virtual image on a front field of view of a driver, and
    a viewpoint detecting camera configured to capture an image of the driver, the method comprising:
    installing a measuring camera configured to capture the virtual image, and
    capturing by the viewpoint detecting camera a calibration pattern for acquiring information for position adjustment, the calibration pattern being attached to a predetermined position with respect to the measuring camera;
    capturing the virtual image by the measuring camera;
    calculating a relative position and a relative orientation between the measuring camera and the viewpoint detecting camera, and calculating a relative position and a relative orientation between the measuring camera and the display device by using an image captured by the viewpoint detecting camera and an image captured by the measuring camera, and calculating a relative position and a relative orientation between the viewpoint detecting camera and the display device from the two relative positions and orientations as orientation information; and adjusting a position of the virtual image displayed by the display device by using the orientation information.

\* \* \* \* \*